US007572495B2

(12) United States Patent
Atkinson

(10) Patent No.: US 7,572,495 B2
(45) Date of Patent: Aug. 11, 2009

(54) LAMINATED FURNITURE COMPONENT AND METHOD

(76) Inventor: Jessica S. Atkinson, 3601 Masonboro Loop Rd., Wilmington, NC (US) 28409

( * ) Notice: Subject to any disclaimer, the term of this patent is extended or adjusted under 35 U.S.C. 154(b) by 250 days.

(21) Appl. No.: 11/708,765

(22) Filed: Feb. 21, 2007

(65) Prior Publication Data

US 2008/0199648 A1 Aug. 21, 2008

(51) Int. Cl.
*B32B 21/13* (2006.01)

(52) U.S. Cl. ...................... 428/58; 428/174; 428/903.3; 29/403.1

(58) Field of Classification Search ................... 428/54, 428/55, 58, 174, 535, 537.1, 903.3; 52/DIG. 9; 29/403.1; 217/88
See application file for complete search history.

(56) References Cited

U.S. PATENT DOCUMENTS 2,118,841 A 5/1938 Elmendorf
3,730,797 A 5/1973 Jensen
3,970,497 A 7/1976 Glover et al.
4,784,887 A 11/1988 Abendroth
5,277,953 A 1/1994 Tsuda
6,428,871 B1 8/2002 Cozzolino
6,534,143 B1 3/2003 Thoma
6,641,885 B2 11/2003 Lou
6,898,834 B1 5/2005 Warren

*Primary Examiner*—Alexander Thomas
(74) *Attorney, Agent, or Firm*—MacCord Mason PLLC

(57) ABSTRACT

Decorative wooden laminated panels are made from barrel staves previously forming parts of barrels used to age wine and other alcoholic beverages, each stave having inner and outer segments, with the inner segment being different in appearance from the outer due to penetration of alcoholic beverage components. The sides of said staves are first trimmed so that the sides are straight and parallel, and the staves are then cut into a plurality of strips. The strips are then formed into a panel with the inner surface of each strip being adjacent the outer surface of an adjacent strip, providing a decorative pattern of alternating contrasting stripes.

20 Claims, 2 Drawing Sheets

LAMINATED FURNITURE COMPONENT AND METHOD

BACKGROUND OF THE INVENTION (1) Field of the Invention

The present invention relates to laminated surfacing panels for use in making furniture and to a method of manufacture of the panels. In particular, the invention relates to the manufacture of laminated surfacing panels from strips of used wine barrels.

(2) Description of the Prior Art

A major component of furniture, both commercial and household furniture, are the surfacing panels used for tops, sides, and the like. Due to the expanse and visibility of these surfacing panels, it is often desirable to construct these components of a visually pleasing material. When making the panels of wood, a large expanse of wood with a pleasing grain or pattern is desired.

However, due to the large dimensions of many surfacing panels, it is difficult and expensive to manufacture the panel of a single wood piece. Therefore, the common practice in the furniture industry is to construct the panel of multiple parts that are joined together. In one type of laminated structure, a substrate of an inexpensive, dimensionally stable material, such as plywood or engineered lumber, is surfaced with a thin sheet of veneer, giving the appearance of a single piece of expensive wood.

It is also known to form furniture parts from strips of wood that are joined along their edges to form a laminated part. These parts may be used as the substrate for furniture parts with a veneer covering as described above, or the surface may be left exposed and finished so that laminated forms the decorative visual surface.

Examples of such lumber are found in U.S. Pat. No.4,784,887 to Abendroth, and U.S. Pat. No. 6,428,871 to Cozzolino. These patents describe the manufacture of wood surfacing products by cutting stacked sheets of veneer or other lumber into laminated strips of lumber, which are then positioned during use so that the edge grain of the lumber strips is exposed, resulting in a wear resistant and decorative surfacing material. The edge grain may be brushed and filled with a filling material of contrasting color to enhance the appearance of the material.

While the above techniques result in durable wood surfacing products having a decorative surface appearance, there is still a need for decorative wood surfacing panels, and in particular panels that can be economically manufactured, while having the durability and required decorative appearance.

SUMMARY OF THE INVENTION

In the present invention, wood surfacing materials meeting these requirements are manufactured from the staves of barrels, usually made from air dried oak, that have been used to age alcoholic beverages, such as wine, bourbon whiskey, tequila, brandy, scotch, cognac, and the like. During the beverage aging process, which may extend over 2 to 12 or more years, components of the beverage penetrate into the inner surface of the barrel staves, creating a stained area of from about 5 to about 25 percent of the stave thickness that contrasts in appearance with the unstained area of the staves.

Generally, the present method creates wood surfacing materials that use this contrasting appearance by the steps of slicing the staves transversely of their front and back surfaces into strips having the desired thickness, and then laminating or adhering the strips together so that the concave inner surface of each strip abuts the convex outer surface of an adjacent strip. Joining of several stave strips in this manner creates a wooden decorative sheet or panel that can be used for a variety of purposes, including commercial and industrial furniture parts, flooring, paneling, etc.

Barrel staves, which are normally from about 18 to 36 inches in length, are double tapered so that the diameter of the barrel is thicker at the center than at the ends to distribute stress evenly in the barrel by making the barrel more spherical, and also making it relatively easy to roll the barrel on its side and change directions with little friction. As a result, barrel staves have convexly curved side edges so that the center width of the stave is wider than the width of the ends. Thus, the first step in using barrel staves that have formed a part of a barrel used to age wine or other alcoholic beverages is to trim the sides of the stave parallel to the longitudinal axis of the stave so that the edges of the stave are parallel to each other.

After trimming, the stave is cut into curved strips that have top and bottom surfaces parallel to the trimmed edges and front and rear sides corresponding to the inner and outer surfaces of the stave. The thickness of the strips will depend on the manner in which the strips are to be used. If the strips are to be laminated to each other to form a sheet without a substrate sheet, i.e., a sheet of plywood, engineered lumber, or the like, then the strips will be of sufficient thickness to provide a sheet with integrity due entirely to the strips, e.g., from about 0.5 inch to about 1 inch in thickness. However, if the strips are to be used with a substrate sheet, the strips can has a lesser thickness, e.g., from about 0.125 to about 0.5 inch.

After cutting to the desired thickness, the strips are joined side-by-side with the inner face of a given strip abutting the outer face of another strip. The alignment of the strips, i.e., the position of the ends of one strip relative to the ends of the adjacent strips is a matter of design choice. The strips may be aligned with the ends adjacent each other, or with the ends offset. The strips are joined to each other by known techniques using a suitable wood glue or adhesive.

The outer surface of the laminated wood panel that is formed by joining a plurality of strips can be finished in a variety of ways common to wood finishing. For example, wood filler can be added to fill any opening of depressed areas in the sheet. The surface can be sanded and/or stained. Generally, a urethane or other transparent or translucent coating will be applied to the surface of the sheet to enhance its decorative appearance and improve durability.

Since one end of the sheet is in the direction of the outer sides of the strips will be convex, while the inner end in the direction of the inner sides of the strips will be concave, it may be desirable in some instances, such as when covering a rectangular area, to trim the outer convex and/or concave ends of the sheet to a straight edge. Alternatively, the laminated sheet can be combined with other non-laminated sheet sections to fill in the spaces.

Various designs, limited only by the designer's imagination, can be created with the laminated sheets. For example, a first rectangular sheet formed of a plurality of curved strips, having their curvature in a first direction, can be combined with a second rectangular sheet section, with the curvature of the strips in said second section being in a direction different, e.g., opposite, from the direction of the strips in the first section. More than two sections can be combined to form a pattern.

These and other aspects of the present invention will become apparent to those skilled in the art after a reading of the following description of the preferred embodiment.

DETAILED DESCRIPTION OF THE INVENTION

Figure 1:
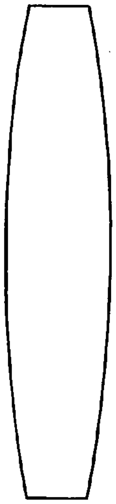
FIG. 1 is a front view of a barrel stave.
Figure 2:
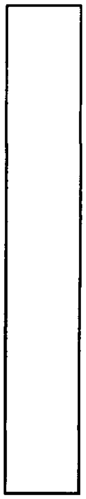
FIG. 2 is a front view of a barrel stave after the edges have been trimmed straight and parallel.
Figure 3:
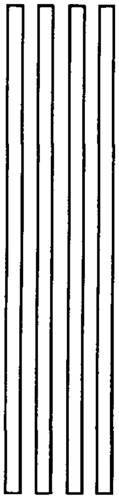
FIG. 3 is a front view of a plurality of barrel stave strips.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

As illustrated in the drawings, barrel staves 10 are first trimmed along their edges parallel to the longitudinal axis of stave 10, resulting in a trimmed stave 12 having straight and parallel side edges. Trimmed stave 12 is then cut into a plurality of strips 14 having equal thicknesses, with the strips being cut parallel to the sides of trimmed stave 12.

Figure 4:
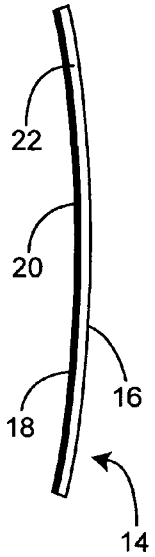
FIG. 4 is a side view of a barrel stave strip showing the contrasting inner and outer segments of the strip.

As shown in FIG. 4, each strip 14 has an outer convex side 16 and an inner concave side 18. Penetration of beverage components into concave side 18 during aging of wine or other alcoholic beverages in the barrel from which stave 10 is acquired results in an inner segment 20 that is different in appearance, e.g., darker, than outer segment 22 that has not been penetrated by the components. In most instances, inner segment 20 will be darker than outer segment 22, and of a different color due to color being imparted to inner segment 20 by the components from the wine or other beverage.

Figure 5:
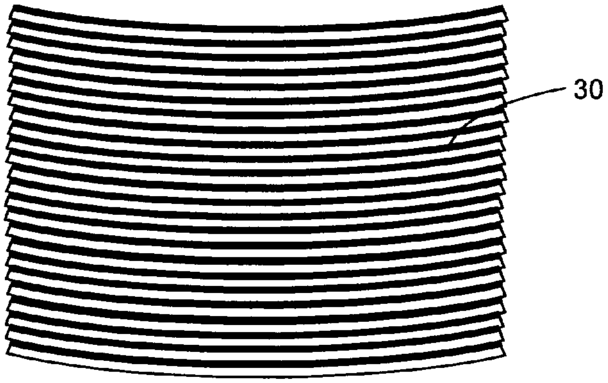
FIG. 5 is a top view of a sheet made by laminating a plurality of barrel stave strips so that the inner and outer segments appear as alternating curved stripes.
Figure 6:
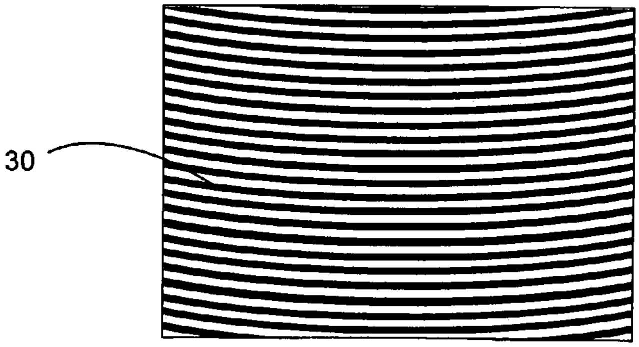
FIG. 6 is a top view of a laminated sheet that has been trimmed so that the sides and ends are parallel.

As illustrated in FIG. 5, strips 14 are combined into sheet 30 by abutting the inner surface 18 of each strip against the outer side 16 of another strip except, of course, for the inner surface 18 of the outermost strip 18 on the concave side. The number of strips used will determine the length of sheet 30 and will depend on the particular design and end use. The sides and ends of sheet 30 may be trimmed to straight edges with the end parallel to each other and the side parallel to each other as illustrated in FIG. 6.

Figure 7:
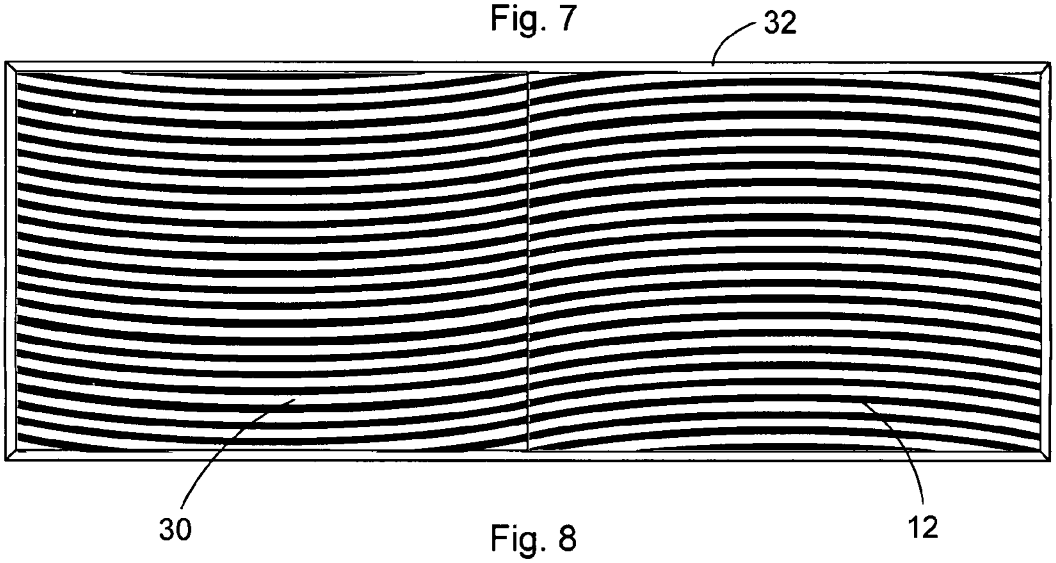
FIG. 7 is an illustration of a composite panel made by joining together two panel segments at the sides of the segments, with one panel segment being a horizontal mirror image of the other segment.
Figure 8:
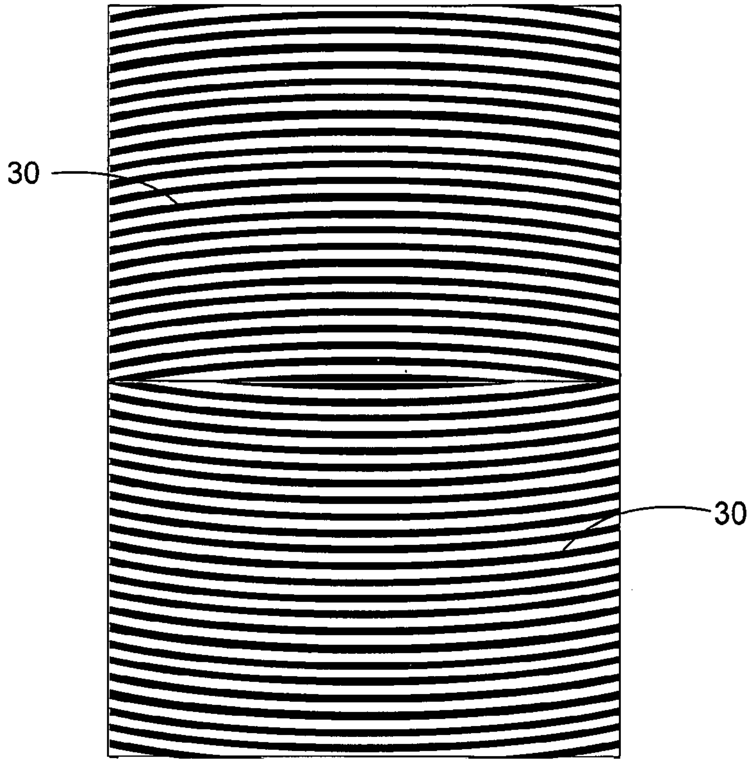
FIG. 8 is an illustration of a composite panel made by joining together two panel segments at the ends of the segments, with one panel segment being a horizontal mirror image of the other segment.
Figure 9:
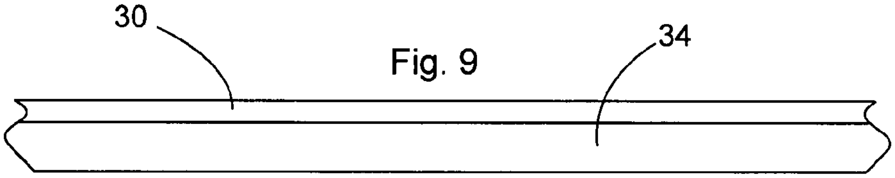
FIG. 9 is an end view of a panel segment mounted on a substrate.

Multiple panel sections 30 can be combined in different ways to produce different designs. For example, as illustrated in FIG. 7, two or more sections 30 can be joined side-by-side, optionally with one sheet horizontally mirrored, i.e., reversed relative to the other sheet, as shown. The furniture top, e.g., a table top, bar top or desk top, illustrated in FIG. 7 can also have a molding 32 about its periphery. Alternatively, as illustrated in FIG. 8, two panel sections 30 can be joined with abutting ends, optionally with one of the sheets horizontally mirrored, to create a different appearance. As illustrated in FIG. 9, panel 30 can also be mounted on a substrate sheet 34, such as plywood or engineered lumber, to provide structural integrity and enable use of a thinner laminated sheet.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A decorative wooden laminated panel comprising a plurality of adjacent curved strips having inner and outer abutting surfaces, the inner surface of each strip have a visual appearance differing from the visual appearance of the outer surface, said difference in visual appearance being due to penetration of the strip inner surface by alcoholic beverage components during aging of a beverage in a barrel from which the strips originated.

2. The panel of claim 1, wherein said alcoholic beverage is wine.

3. The panel of claim 1, wherein said difference in appearance is a difference in color.

4. The panel of claim 1, wherein said strips have a width of from about 0.125 inch to about 1.0 inch.

5. The panel of claim 1, wherein said panel includes a first panel section formed of a plurality of curved strips, with the curvature of the strips in said first section being in a first direction, and a second panel section formed of a plurality of curved strips, with the curvature of the strips in said second section being in second direction opposite from said first direction.

6. The panel of claim 1, wherein said panel has parallel sides.

7. The panel of claim 1, in combination with at least one other panel having the same construction.

8. A decorative wooden laminated panel comprising a plurality of adjacent strips having concave inner and convex outer abutting segments, the inner segment of each strip have a visual color differing from the color of the outer segment, said color difference being due to penetration into the strip inner segment of wine components during aging of wine in a barrel from which the strips originated.

9. The panel of claim 8, further including edge molding.

10. The panel of claim 8, wherein said strips have a width of from about 0.125 inch to about 1.0 inch.

11. The panel of claim 8, wherein said panel includes a first panel section formed of a plurality of curved strips, with the curvature of the strips in said first section being in a first direction, and a second panel section formed of a plurality of curved strips, with the curvature of the strips in said second section being in second direction opposite from said first direction.

12. The panel of claim 8, wherein said panel has parallel sides.

13. The panel of claim 8, in combination with at least one other panel having the same construction.

14. The panel of claim 8, mounted on a substrate panel.

15. A method of making a decorative wooden laminated panel from barrel staves having an inner and outer portions, with the inner portion being different in appearance due to penetration of alcoholic beverage components comprising:

a) providing one or more barrel staves having upper and lower surfaces and side edges;

b) trimming the sides of said staves so that the sides are straight and parallel;

c) cutting the staves parallel to the side edges into a plurality of strips, each of said strips having a convex outer side, a concave inner side with an appearance different from said convex outer side, and upper and lower parallel surfaces; and d) joining said strips together so with the inner surface of each strip being adjacent the outer surface of an adjacent strip.

16. The method of claim 15, wherein the strips are joined with the strip outer surfaces being in a common plane.

17. The method of claim 15, wherein said strips have a width of from about 0.125 to about 1.0 inch.

18. The method of claim 15, wherein said staves are from wine barrels previously used in aging of wine.

19. The method of claim 15, further including the step of trimming the edges of said panel to form a rectangular panel.

20. The method of claim 15, further including the step of joining said panel to other panels made by the same method.

* * * * *